US006776711B1

(12) United States Patent
Baerlocher

(10) Patent No.: US 6,776,711 B1
(45) Date of Patent: Aug. 17, 2004

(54) GAMING DEVICE HAVING A BONUS ROUND WITH MULTIPLE RANDOM AWARD GENERATION AND MULTIPLE RETURN/ RISK SCENARIOS

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 161 days.

(21) Appl. No.: 09/678,989

(22) Filed: Oct. 4, 2000

(51) Int. Cl.[7] .................................................. A63F 13/00
(52) U.S. Cl. ............................................ 463/16; 463/25
(58) Field of Search .............................. 463/16, 21, 22, 463/20, 25; 273/143 R, 138 A

(56) References Cited

U.S. PATENT DOCUMENTS 4,448,419 A 5/1984 Telnaes
4,582,324 A 4/1986 Koza et al.
4,624,459 A 11/1986 Kaufman (List continued on next page.)

FOREIGN PATENT DOCUMENTS

| | | | | |
|---|---|---|---|---|
| EP | 0874337 A1 | | 10/1998 | |
| EP | 0926645 A2 | | 6/1999 | |
| EP | 0944030 A2 | | 9/1999 | |
| EP | 0945837 A2 | | 9/1999 | |
| EP | 0981119 A2 | | 2/2000 | |
| EP | 0984408 A | | 3/2000 | |
| EP | 0984409 A2 | | 3/2000 | |
| GB | 2105891 | * | 3/1983 | ........... G07F/17/34 |
| GB | 2144644 A | * | 3/1985 | ............. A63F/9/22 |
| GB | 2183882 A | * | 6/1987 | ............. G01S/3/46 |
| WO | WO 9732285 | | 9/1997 | |
| WO | WO 00/12186 | | 3/2000 | |

OTHER PUBLICATIONS

Wheel Poker Article written by Strictly Slots (Anchor Games), published in Nov. 2000.

Winning Streak Web Site Description written by WMS Gaming Inc. (web site), printed on Mar. 21, 2001.

X Factor Advertisement and Website page written by WMS Gaming, Inc., published in 1998.

Psycho Cash Beast Club (including knockouts) written by Barcrest, published prior to 1998.

Richard Petty Advertisement written by IGT, published in 2000.

South Park—Dodgeball Advertisement written by IGT, published in 2000.

(List continued on next page.)

*Primary Examiner*—Teresa Walberg
*Assistant Examiner*—Aaron Enatsky
(74) *Attorney, Agent, or Firm*—Bell, Boyd & Lloyd LLC

(57) ABSTRACT

The present provides a multileveled bonus round having a plurality of random generations, differing average awards and differing levels of risk. The gaming device contains a display that prompts the player to select one of a plurality of pick buttons. When the player does so, the game assigns an award set to each pick button of the display. The game then displays each of the awards in the award sets so that the player can easily recognize the assignments. The game randomly chooses one of the awards from each of the award sets and displays the chosen awards. The player's award for any given level is thus the selected award of the selected award set of the picked or chosen pick button. The awards of the present invention can be an award multiplier, outright base game credits or a bonus round terminator. A bonus round terminator terminates the bonus round. The game proceeds though all the levels of the round in the manner just described until the game selects a bonus round terminator or the player exhausts all the levels.

39 Claims, 7 Drawing Sheets

U.S. PATENT DOCUMENTS

| | | | | |
|---|---|---|---|---|
| 4,695,053 A | | 9/1987 | Vazquez, Jr. et al. | |
| 4,991,848 A | | 2/1991 | Greenwood et al. | |
| 5,178,390 A | | 1/1993 | Okada | |
| 5,205,555 A | | 4/1993 | Hamano | |
| 5,342,047 A | | 8/1994 | Heidel et al. | |
| 5,456,465 A | | 10/1995 | Durham | |
| 5,524,888 A | | 6/1996 | Heidel | |
| 5,536,016 A | | 7/1996 | Thompson | |
| 5,542,669 A | | 8/1996 | Charron et al. | |
| 5,560,603 A | | 10/1996 | Seelig et al. | |
| 5,611,535 A | | 3/1997 | Tiberio | |
| 5,711,525 A | | 1/1998 | Breeding | |
| 5,769,716 A | | 6/1998 | Saffari et al. | |
| 5,772,509 A | | 6/1998 | Weiss | |
| 5,775,692 A | | 7/1998 | Watts et al. | |
| 5,788,573 A | | 8/1998 | Baerlocher et al. | |
| 5,823,874 A | | 10/1998 | Adams | |
| 5,833,538 A | | 11/1998 | Weiss | |
| 5,848,932 A | | 12/1998 | Adams | |
| 5,851,148 A | | 12/1998 | Brune et al. | |
| 5,873,781 A | | 2/1999 | Keane | |
| 5,882,261 A | | 3/1999 | Adams | |
| 5,902,184 A | | 5/1999 | Bennett et al. | |
| 5,911,418 A | | 6/1999 | Adams | |
| 5,947,820 A | | 9/1999 | Morro et al. | |
| 5,951,397 A | | 9/1999 | Dickinson | |
| 5,964,463 A | | 10/1999 | Moore, Jr. | |
| 5,967,894 A | | 10/1999 | Kinoshita et al. | |
| 5,980,384 A | | 11/1999 | Barrie | |
| 5,984,781 A | | 11/1999 | Sunaga | |
| 5,997,400 A | | 12/1999 | Seelig et al. | |
| 5,997,401 A | | 12/1999 | Crawford | |
| 6,004,207 A | | 12/1999 | Wilson, Jr. et al. | |
| 6,015,346 A | | 1/2000 | Bennett | |
| 6,019,369 A | | 2/2000 | Nakagawa et al. | |
| 6,033,306 A | * | 3/2000 | De Souza | 273/139 |
| 6,033,307 A | | 3/2000 | Vancura | |
| 6,056,642 A | | 5/2000 | Bennett | |
| 6,059,289 A | | 5/2000 | Vancura | |
| 6,059,658 A | | 5/2000 | Mangano et al. | |
| 6,062,980 A | | 5/2000 | Luciano | |
| 6,089,976 A | | 7/2000 | Schneider et al. | |
| 6,089,977 A | | 7/2000 | Bennett | |
| 6,089,978 A | | 7/2000 | Adams | |
| 6,093,102 A | | 7/2000 | Bennett | |
| 6,102,798 A | | 8/2000 | Bennett | |
| 6,120,031 A | | 9/2000 | Adams | |
| 6,126,541 A | | 10/2000 | Fuchs | |
| 6,126,542 A | | 10/2000 | Fier | |
| 6,142,873 A | | 11/2000 | Weiss et al. | |
| 6,142,874 A | | 11/2000 | Kodachi et al. | |
| 6,142,875 A | | 11/2000 | Kodachi et al. | |
| 6,146,273 A | | 11/2000 | Olsen | |
| 6,159,095 A | | 12/2000 | Frohm et al. | |
| 6,159,096 A | | 12/2000 | Yoseloff | |
| 6,159,097 A | | 12/2000 | Gura | |
| 6,159,098 A | * | 12/2000 | Slomiany et al. | 273/139 |
| 6,162,121 A | | 12/2000 | Morro et al. | |
| 6,168,520 B1 | | 1/2001 | Baerlocher et al. | |
| 6,168,523 B1 | | 1/2001 | Piechowiak et al. | |
| 6,173,955 B1 | | 1/2001 | Perrie et al. | |
| 6,174,233 B1 | | 1/2001 | Sunaga et al. | |
| 6,174,235 B1 | * | 1/2001 | Walker et al. | 273/139 |
| 6,190,254 B1 | | 2/2001 | Bennett | |
| 6,190,255 B1 | * | 2/2001 | Thomas et al. | 463/20 |
| 6,203,429 B1 | | 3/2001 | Demar et al. | |
| 6,210,279 B1 | | 4/2001 | Dickinson | |
| 6,213,876 B1 | | 4/2001 | Moore, Jr. | |
| 6,224,483 B1 | | 5/2001 | Mayeroff | |
| 6,231,442 B1 | | 5/2001 | Mayeroff | |
| 6,231,445 B1 | | 5/2001 | Acres | |
| 6,261,177 B1 | | 7/2001 | Bennett | |
| 6,302,790 B1 | | 10/2001 | Brossard | |
| 6,305,686 B1 | | 10/2001 | Perrie et al. | |
| 6,309,300 B1 | * | 10/2001 | Glavich | 463/16 |
| 6,328,649 B1 | | 12/2001 | Randall et al. | |
| 6,347,996 B1 | * | 2/2002 | Gilmore et al. | 273/139 |
| 6,375,187 B1 | | 4/2002 | Baerlocher | |

OTHER PUBLICATIONS

Spell Binder Advertisement written by IGT, published in 2000.

Sphinx Advertisement written by Atronic Casino Technology, Ltd., published in 1997.

Take Your Pick Article written by Strictly Slots, published in Mar. 2001.

Take Your Pick Advertisement written by IGT/Anchor Gaming, published in 1999.

Texas Tea Advertisement written by IGT, published in 2000.

The Deals of Let's Make a Deal written by fortunecity.com (2 pages), printed on Mar. 16, 2001.

The Official Let's Make a Deal Website written by Bally Gaming System Website, printed on Mar. 16, 2001.

Top Cat Advertisement written by WMS Gaming, Inc., published prior to 2000.

Top Dollar Game Advertisement written by IGT, published in 1998.

Totem Pole Advertisement written by IGT, published in 1997.

Treasure Wheel/Treasure Tunnel Advertisement written by Sigma Game, Inc., published prior to 2000.

Wheel of Fortune Advertisement written by IGT, published in 1998.

Wheel of Fortune Advertisement written by IGT, published in 1999.

Let's Make a Deal written by geocities.com (10 pages), printed on Mar. 21, 2001.

Let's Make a Deal written by fortunecity.com (4 pages), printed on Mar. 21, 2001.

Let's Make a Deal written by Illinoislottery.com (1 page), printed on Mar. 21, 2001.

Let's Make a Deal geocities.com (2 pages), printed on Mar. 16, 2001.

Let's Make a Deal Advertisement written by Shuffle Master and IGT, published in 2001.

Let's Make a Deal Game Advertisement written by Bally Gaming Systems, published in 1999.

Little Green Men Advertisement and Article written by IGT, Strictly Slots, published in 2000.

MegaJackpots Advertisement written by IGT, published in 1998.

Money Grab Article written by Strictly Slots, published in Apr. 2001.

Money in the Bank Advertisement written by Strictly Slots Konami, published in 2001.

Monopoly Advertisements and Articles written by WMS Gaming, Inc., Strictly Slots, published in 1998, 1999, 2000.

Monopoly Party Train Article written by Strictly Slots, published in 2002.

On the Money Article written by Strictly Slots, Casino Data Systems, published in Dec. 2000.

Polly & Roger Advertisement written by VLC, Inc., published in 2000.

Price is Right "Cliff Hangers" Description written by www-.geocities.com; members.aol.com (web site), printed Mar. 21, 2001.
Price is Right "Showcases" Description written by schuminweb.com (web site), printed Mar. 26, 2001.
Bonus Spin Red, White & Blue Advertisement written by IGT, published in 2000.
Bonus Times Article written by Strictly Slots, published in 2000.
By George written by IGT, published in 2002.
Caribbean Gold II Advertisement written by Aristocrat Incorporated, published in 1998.
Cash Box Advertisement & Article written by Anchor Games, Strictly Slots, published in 2000.
Chutes & Ladders Game Instructions writen by Hasbro–Milton Bradley, published in 1999.
Description of Let's Make a Deal Television Show written by letsmakeadeal.com (2 pages), printed on Mar. 16, 2001.
Double Diamond Game Descriptions written by IGT printed on Mar. 21, 2001.
Double Up Poker Game Description written by IGT Undated.
East Street Advertisements and Articles written by Casino Data Systems, published in 2000.
Elvis Advertisement written by IGT, published in 1999.
Empire Game Advertisement written by AC Coin, publihsed in 1996.
Fire and Fortune Article written by Strictly Slots, published in 2001.
Fox "N" Hound Advertisement written by IGT, published in 2000.
In Between Game Description written by IGT, available prior to 2000.
Keep Your Hat on Advertisement written by Aristocrat, published in 2001.
Addams Family Advertisement and Article written by IGT, Strictly Slots, published in 2000.
Adders and Ladders Advertisement written by Barcrest Ltd., published prior to 2000.
American Thunder Screen Shots written by IGT, published in 1998.
Big Bang Piggy Bankin Advertisement written by WMS Gaming, Inc., published prior to 2000.
Blackjack/Twenty–One Description written by Hoyle's of Games, published in 1993.
Jackpot Party Brochures and Articles published by WMS Gaming, Inc. in 1998.

* cited by examiner

52

| LEVEL (54) | AWARD SET (56) | AWARD SET (58) |
|---|---|---|
| 1 | 2, 5, 7, 8 (56a) | 3, 4, 5, 9 (58a) |
| 2 | 4, 7, 8, 11 (56b) | 5, 6, 9, 12 (58b) |
| 3 | 10, 12, 15, 25, TERM (56c) | 12, 15, 18, 22, TERM (58c) |
| 4 | 30, 33, TERM (56d) | 35, 45, TERM (58d) |
| 5 | 50, 70, TERM, TERM (56e) | 60, 80, TERM, TERM (58e) |

| LEVEL | AWARD SET | AWARD SET |
|---|---|---|
| 1 | 2, 5, 7, 8 | 3, 4, 5, 9 |
| 2 | 4, 7, 8, 11 | 5, 6, 9, 12 |
| 3 | 10, 12, 15, 25, TERM | 12, 15, 18, 22, TERM |
| 4 | 30, 33, TERM | 35, 45, TERM |
| 5 | 50, 70, TERM, TERM | 60, 80, TERM, TERM |
| 6 | 100 | 120 |

FIG. 8

66

54

70

56

| | LEVEL 1 | LEVEL 2 | LEVEL 3 | LEVEL 4 | LEVEL 5 |
|---|---|---|---|---|---|
| 2 | 25% | 0% | 0% | 0% | 0% |
| 4 | 0% | 20% | 0% | 0% | 0% |
| 5 | 25% | 30% | 0% | 0% | 0% |
| 7 | 25% | 30% | 0% | 0% | 0% |
| 8 | 25% | 20% | 0% | 0% | 0% |
| 10 | 0% | 0% | 20% | 0% | 0% |
| 11 | 0% | 0% | 0% | 0% | 0% |
| 12 | 0% | 0% | 20% | 0% | 0% |
| 15 | 0% | 0% | 25% | 0% | 0% |
| 25 | 0% | 0% | 25% | 0% | 0% |
| 30 | 0% | 0% | 0% | 35% | 0% |
| 33 | 0% | 0% | 0% | 35% | 0% |
| 50 | 0% | 0% | 0% | 0% | 30% |
| 70 | 0% | 0% | 0% | 0% | 20% |
| TERM | 0% | 0% | 10% | 30% | 50% |

58

| | LEVEL 1 | LEVEL 2 | LEVEL 3 | LEVEL 4 | LEVEL 5 |
|---|---|---|---|---|---|
| 3 | 25% | 0% | 0% | 0% | 0% |
| 4 | 25% | 0% | 0% | 0% | 0% |
| 5 | 25% | 20% | 0% | 0% | 0% |
| 6 | 0% | 30% | 0% | 0% | 0% |
| 9 | 25% | 30% | 0% | 0% | 0% |
| 12 | 0% | 30% | 20% | 0% | 0% |
| 15 | 0% | 0% | 20% | 0% | 0% |
| 18 | 0% | 0% | 25% | 0% | 0% |
| 22 | 0% | 0% | 25% | 0% | 0% |
| 35 | 0% | 0% | 0% | 35% | 0% |
| 45 | 0% | 0% | 0% | 35% | 0% |
| 60 | 0% | 0% | 0% | 0% | 30% |
| 80 | 0% | 0% | 0% | 0% | 20% |
| TERM | 0% | 0% | 10% | 30% | 50% |

FIG. 9

GAMING DEVICE HAVING A BONUS ROUND WITH MULTIPLE RANDOM AWARD GENERATION AND MULTIPLE RETURN/RISK SCENARIOS

This application is related to the following commonly-owned co-pending patent applications: "GAMING DEVICE HAVING SEPARATELY CHANGEABLE VALUE AND MODIFIER BONUS SCHEME," Ser. No. 09/626,045, "GAMING DEVICE HAVING AN AWARD EXCHANGE BONUS ROUND AND METHOD FOR REVEALING AWARD EXCHANGE POSSIBILITIES," Ser. No. 09/689,510, "GAMING DEVICE HAVING GRADUATING AWARD EXCHANGE SEQUENCE WITH A TEASE CONSOLATION SEQUENCE AND AN INITIAL QUALIFYING SEQUENCE," Ser. No. 09/680,601, "GAMING DEVICE HAVING A DESTINATION PURSUIT BONUS SCHEME WITH ADVANCED AND SETBACK CONDITIONS," Ser. No. 09/686,409, "GAMING DEVICE HAVING VALUE SELECTION BONUS," Ser. No. 09/684,605"GAMING DEVICE HAVING RISK EVALUATION BONUS ROUND," Ser. No. 09/688,434, "GAMING DEVICE HAVING AN IMPROVED OFFER/ACCEPTANCE BONUS SCHEME," Ser. No. 09/966,884, "GAMING DEVICE HAVING IMPROVED OFFER AND ACCEPTANCE BONUS SCHEME," Ser. No. 09/680,630"GAMING DEVICE HAVING IMPROVED AWARD OFFER BONUS SCHEME," Ser. No. 09/682,368, "GAMING DEVICE HAVING OFFER AND ACCEPTANCE GAME WITH HIDDEN OFFER," Ser. No. 10/160,688, "GAMING DEVICE HAVING OFFER ACCEPTANCE GAME WITH TERMINATION LIMIT," Ser. No. 09/822,711, "GAMING DEVICE HAVING OFFER/ACCEPTANCE ADVANCE THRESHOLD AND LIMIT BONUS SCHEME," Ser. No. 09/838,014, "GAMING DEVICE HAVING IMPROVED OFFER AND ACCEPTANCE GAME WITH MASKED OFFERS," Ser. No. 10/086,014, "GAMING DEVICE HAVING AN OFFER AND ACCEPTANCE SELECTION BONUS SCHEME WITH A TERMINATOR AND AN ANTI-TERMINATOR," Ser. No. 09/945,082, "GAMING DEVICE HAVING AN AWARD OFFER AND TERMINATION BONUS SCHEME," Ser. No. 09/682,428, "GAMING DEVICE HAVING AN OFFER AND ACCEPTANCE GAME WITH A PLAYER SELECTION FEATURE," Ser. No. 10/086,078, and "GAMING DEVICE HAVING IMPROVED OFFER AND ACCEPTANCE BONUS SCHEME," Ser. No. 10/074,273.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a bonus round with multiple random generation and multiple return/risk scenarios.

BACKGROUND OF THE INVENTION

Gaming machines currently exist with bonus rounds in which a player has one or more opportunities to choose masked bonus awards from a group of symbols arranged in a pattern and displayed to the player. When the player chooses a masked symbol from the pattern, the bonus round removes the mask and either displays a bonus value or a bonus round terminator which terminates the bonus round. The controller of the gaming machine randomly places a predetermined number of bonus round awards and bonus terminators in the pattern at the beginning of the bonus round and maintains the positioning until the bonus round terminates. The outcome depends upon whether the player selects an award or terminator.

European Patent Application No. EP 0 945 837 A2 which is assigned on its face to WMS Gaming, Inc. discloses a bonus round of this type. In this type of round, each time the player enters the bonus round, the player has the same diminishing chance to select an award instead of a terminator. For example, that application discloses a bonus round that has 30 possible selections, 24 bonus awards and 6 bonus round terminators. Each time the player enters the bonus round, the player has a 100% chance of having a first pick, an 80% chance of having a second pick, a 63% chance of having a third pick, a 50% chance of having a fourth pick and so on.

It should be appreciated that once a bonus round of the type described above begins, the game will not change or alter the values of the masked awards. Once the game displays the masked awards, the game sets the values and positions for each award and does not alter either during the round. Therefore, the implementor of the above type of bonus round has one opportunity to generate or distribute awards having relatively high and low values. For example, the application discloses a bonus round that has one 20 credit award, two 15 credit awards, two 10 credit awards, eight 5 credit awards, two 4 credit awards, three 3 credit awards, four 2 credit awards and two 1 credit awards. As the player advances through this type of bonus round, the probability of the player receiving an award having a particular value, e.g., an award having a high value, only increases slightly due to the lessening of remaining selections. Likewise, as discussed above, the probability of the player obtaining a bonus terminator increases by the lessening of remaining selections.

Because the above bonus scheme has only one opportunity to generate a set of values and because the probability of selecting a particular award or a bonus terminator only increases due to the lessening of remaining selections, bonus rounds of this type have no effective ability to alter their return/risk ratio so that players will receive higher bonuses as they advance farther and farther through the bonus round. For example, in the distribution stated above, the player has a 1 in 30 or 3.33% chance of selecting the 20 credit award in the player's first selection, a 1 in 29 or 3.45% chance in the second selection, a 3.57% chance in the third selection and a 3.70% chance in the fourth selection. The player has roughly the same probability in each selection to choose the high value award.

Increasing the number of high value awards does not solve the problem. If the above example included five 20 credit awards instead of just one, the probability distribution would change to 16.7% (5 in 30), 17.2% (5 in 29), 17.9% (5 in 28) and 18.5% (5 in 27), respectively. It should be appreciated that decreasing the total number of selections has roughly the same effect as increasing the number of high value awards. Thus, in the above type of gaming device, the player has roughly the same chance of choosing a high value award in the first pick as in the second, roughly double the chance of choosing a high value award in the first two selections as in the third selection, roughly three times the chance of choosing a high value award in the first three selections as in the fourth selection and so on.

Likewise, the above type of gaming device has no effective way to increase risk from one selection to the next. There is a 6 in 30 or 20% chance of terminating the round on the first selection, a 20.7% chance of terminating on the second selection, a 21.4% of terminating on the third, a 22.2% of terminating on the fourth and so on. The above type of gaming device cannot effectively alter return, risk or return/risk.

It should be appreciated that varying award returns and risk of bonus round termination increases player excitement and enjoyment. Players enjoy playing for high bonus awards or high return rounds. Gaming devices preferably present a risk of termination that is commensurate with the likelihood or rewarding a high return, and players enjoy playing high risk, high return games. Players also enjoy playing a game that lasts an extended period of time and provides a plurality of awards. Thus, it is desirable to have a bonus round of a gaming device that provides initial selections that are relatively low return/low risk and later selections having increasingly higher returns and higher risk.

SUMMARY OF THE INVENTION

The present invention overcomes the limitations of known gaming device bonus rounds by providing a multi-level bonus round, wherein each level includes a plurality of random generation mechanisms or components, and wherein each level includes a different average award value and risk of termination. The gaming device additionally includes a display that is preferably interactive, and which enables the player to make a selection in each level that causes the game to produce a randomly generated award.

Upon a bonus round triggering event, the video monitor produces an initial display that prompts the player to select from a plurality of pick buttons shown on the display. In the embodiment discussed below, the bonus round contains two pick buttons, however, the present invention can provide any number.

The gaming device maintains a database for the bonus round that is separated, as is the bonus round, by a plurality of levels. The database and thus the bonus round can contain any number of levels. The levels of the database each contain a number of award sets, wherein the number of these sets is equal to or greater than the number of pick buttons on the display. The award sets enable the implementor of the gaming device to tailor or create a level having a high or low average payout and a high or low risk of bonus round termination. Since there are multiple levels, there can be different average awards and risks of termination.

The player's choice of one of the pick buttons is the first random generation component to the eventual award of the current level in the bonus round. That is, the player's award will come from the pick button that the player selects. The pick buttons not selected by the player will show awards that the player could have obtained and thus the player's relative success or failure in the bonus round.

When the player picks or chooses one of the pick buttons, the game provides the second random generation component to the eventual award of the current level by assigning one of the award groups, mentioned above, to each pick button of the display. The game then provides a series of displays, wherein the game first flashes or highlights or otherwise displays each of the awards in the award sets in close enough proximity to the set's assigned pick button that the player can easily recognize the assignments for the current level.

Next, the game randomly chooses one of the awards from each of the award sets and displays the chosen awards in the same proximity to their associated pick buttons. The selection of one of the awards provides the third and final random generation component to the player's award for the level. The player's award for any given level is thus the selected award of the selected award set of the picked or chosen pick button.

The word "award" for purposes of this invention includes award multipliers that are multiplied by a number of base game credits, an outright award of base game credits or a bonus round terminator. That is, the award sets described above can include any of these. If the game awards multipliers or base game credits, the game updates the player's credits, preferably in the bonus round display.

When the game selects a bonus round terminator, the bonus round ends. If no bonus round terminator is selected, the game proceeds to the next level of the bonus round and proceeds in the manner described immediately above until the game selects a bonus round terminator or the player exhausts the levels provided by the bonus round.

It is therefore an object of the present invention to provide a gaming device with a bonus round wherein the game randomly generates awards or bonus values at multiple stages or times during the round.

Another object of the present invention is to provide a bonus round having varying award values and varying risk so that the player has multiple opportunities to play for awards as well as an opportunity to win a high value award.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 8 is a table illustrating the multipe levels of another embodiment of the present invention wherein each level has multiple sets of awards; and FIG. 9 is a table having multiple levels wherein the award for each level is associated with a probability of being selected.

DETAILED DESCRIPTION OF THE INVENTION

Gaming Device and Electronics

Figure 1:
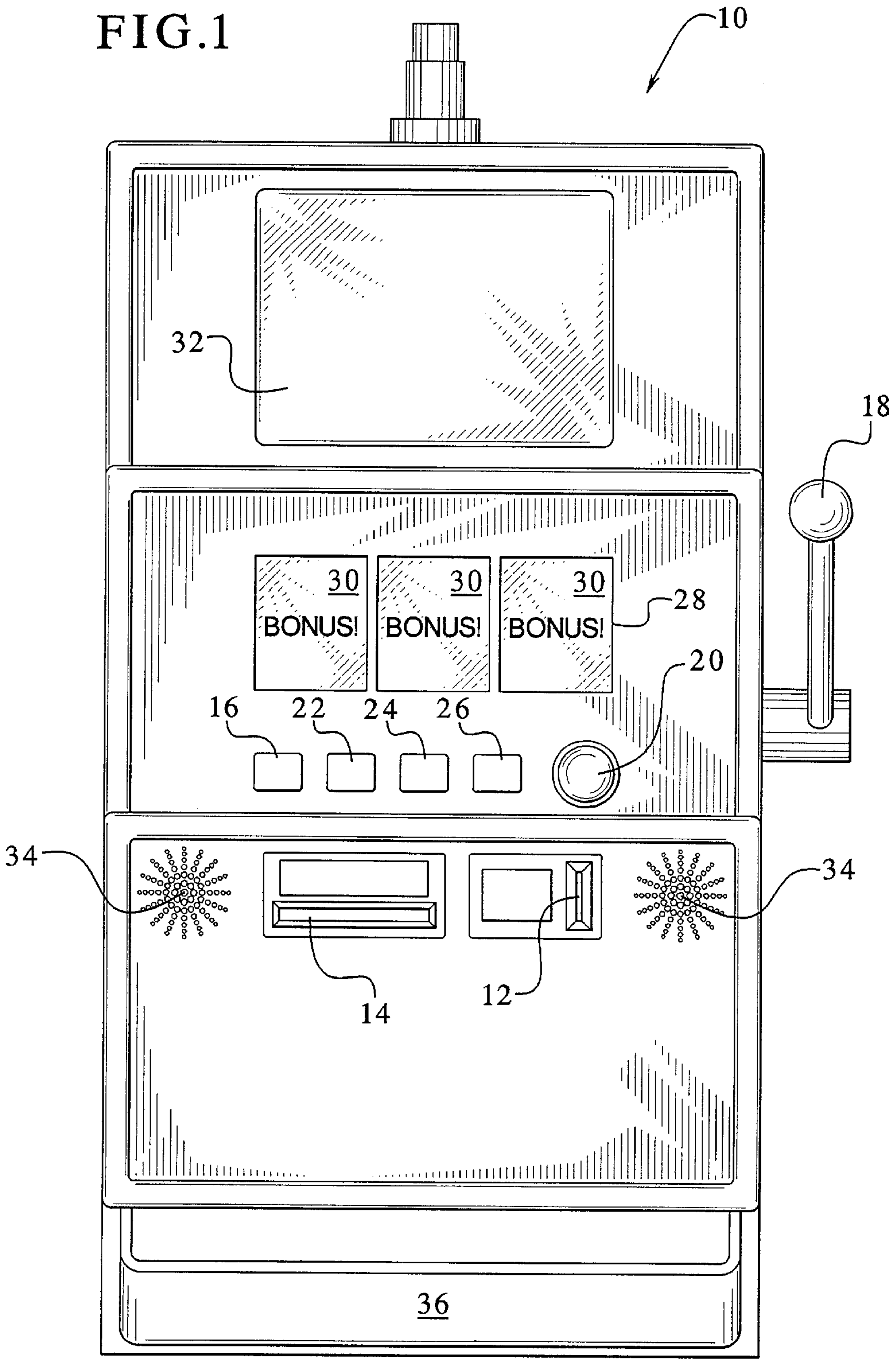
FIG. 1 is a front plan view of one embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any of their bonus triggering events which trigger the bonus game of the present invention. The symbols and indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling the arm 18, or pushing play button 20. Play button 20 can be any play activator used by the player which starts any game or sequence of events in the gaming device.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a paystop display 28 which contains a plurality of reels 30, preferably three to five reels in mechanical or video form. Each reel 30 displays a plurality of indicia such as bells, hearts, fruits, numbers, letters, bars or other images which preferably correspond to a theme associated with the gaming device 10. If the reels 30 are in video form, the gaming device 10 preferably displays the video reels 30 on the video monitor 32 instead of on the paystop display 28. Gaming device 10 preferably also includes speakers 34 for making sounds or playing music.

At any time during the game, a player may "cash out" and thereby receive a number of coins corresponding to the number of remaining credits by pushing a cash out button 26. When the player "cashes out," the player receives the coins in a coin payout tray 36. The gaming device 10 may employ other payout mechanisms such as credit slips redeemable by a cashier or electronically recordable cards which keep track of the player's credits.

Figure 2:
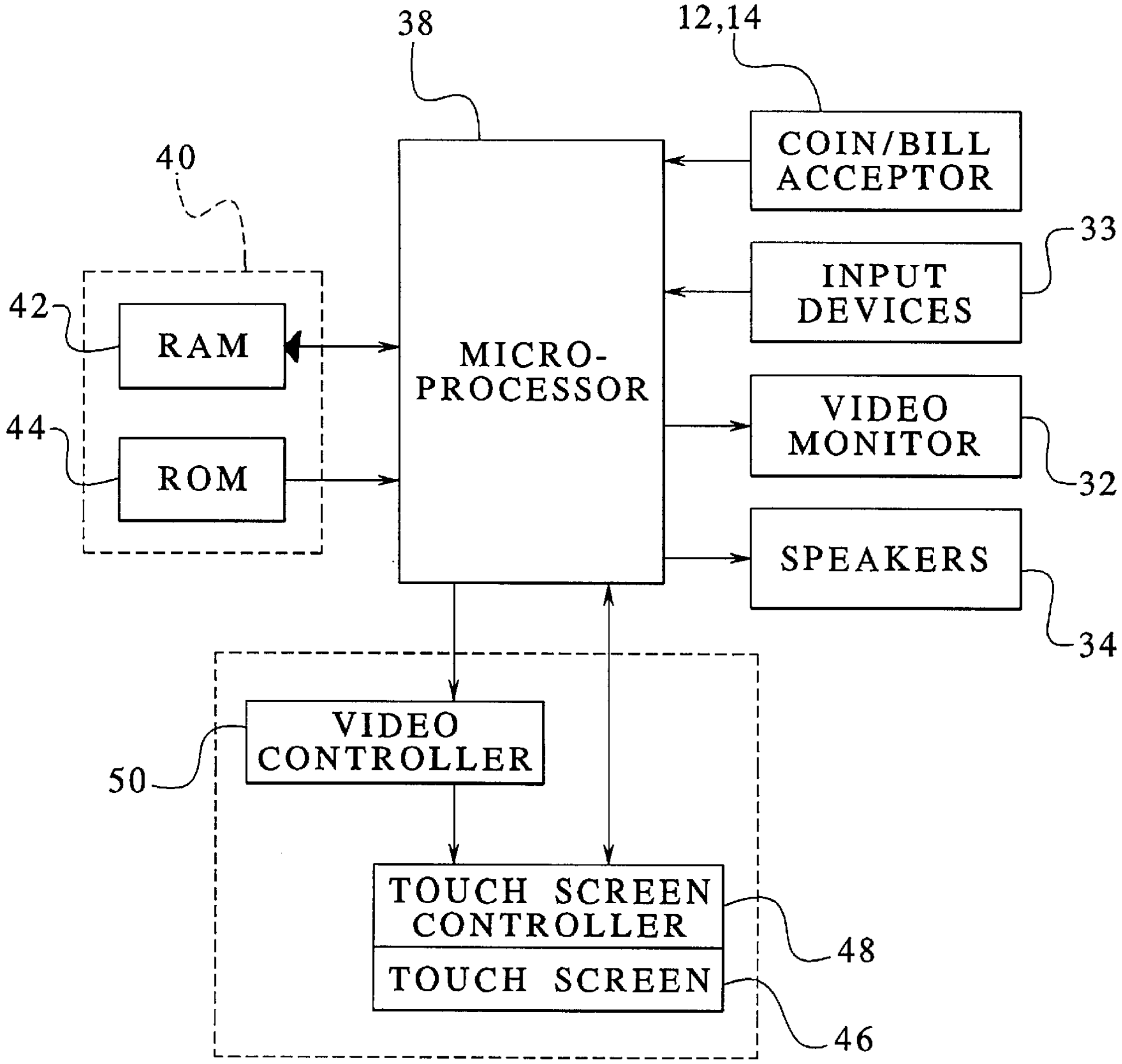
FIG. 2 is a schematic block diagram of the electronic configuration of one embodiment of the gaming device of the present invention.

With respect to electronics, gaming device 10 preferably includes the electronic configuration generally illustrated in FIG. 2, which has: a processor 38; a memory device 40 for storing program code or other data; a video monitor 32 or other display device (i.e., a liquid crystal display); a plurality of speakers 34; and at least one input device as indicated by block 33 such as the arm 18, play button 20, the bet one button 24 and the cash out button 26. The processor 38 is preferably a microprocessor or microcontroller-based platform which is capable of displaying images, symbols and other indicia such as images of people, characters, places, things and faces of cards. The memory device 40 can include random access memory (RAM) 42 for storing event data or other data generated or used during a particular game. The memory device 40 can also include read only memory (ROM) 44 for storing program code which controls the gaming device 10 so that it plays a particular game in accordance with applicable game rules and pay tables.

As illustrated in FIG. 2, the player preferably uses play buttons 20 to input signals into gaming device 10. Furthermore, it is preferable that touch screen 46 and an associated touch screen controller 48 are used instead of a conventional video monitor 32. Touch screen 46 and touch screen controller 48 are connected to a video controller 50 and processor 38. A player can make decisions and input signals into the gaming device 10 by touching touch screen 46 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer."With reference to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, gaming device 10 also preferably gives players the opportunity to win credits in a bonus game. This type of gaming device 10 will include a program which will automatically initiate the bonus game that will take effect or occur when the player has achieved a qualifying condition in the game. This qualifying condition can be a particular arrangement of indicia on the paystop display 28. The gaming device 10 also includes a display device such as a video monitor 32 shown in FIG. 1 enabling the player to play the bonus round. Preferably, the qualifying condition is a predetermined combination of indicia appearing on a plurality of reels 30. As illustrated in the three reel slot game shown in FIG. 1, the qualifying condition could be the text "BONUS!" appearing in the same location on three adjacent reels.

Bonus Round Components

Figures 3, 4:
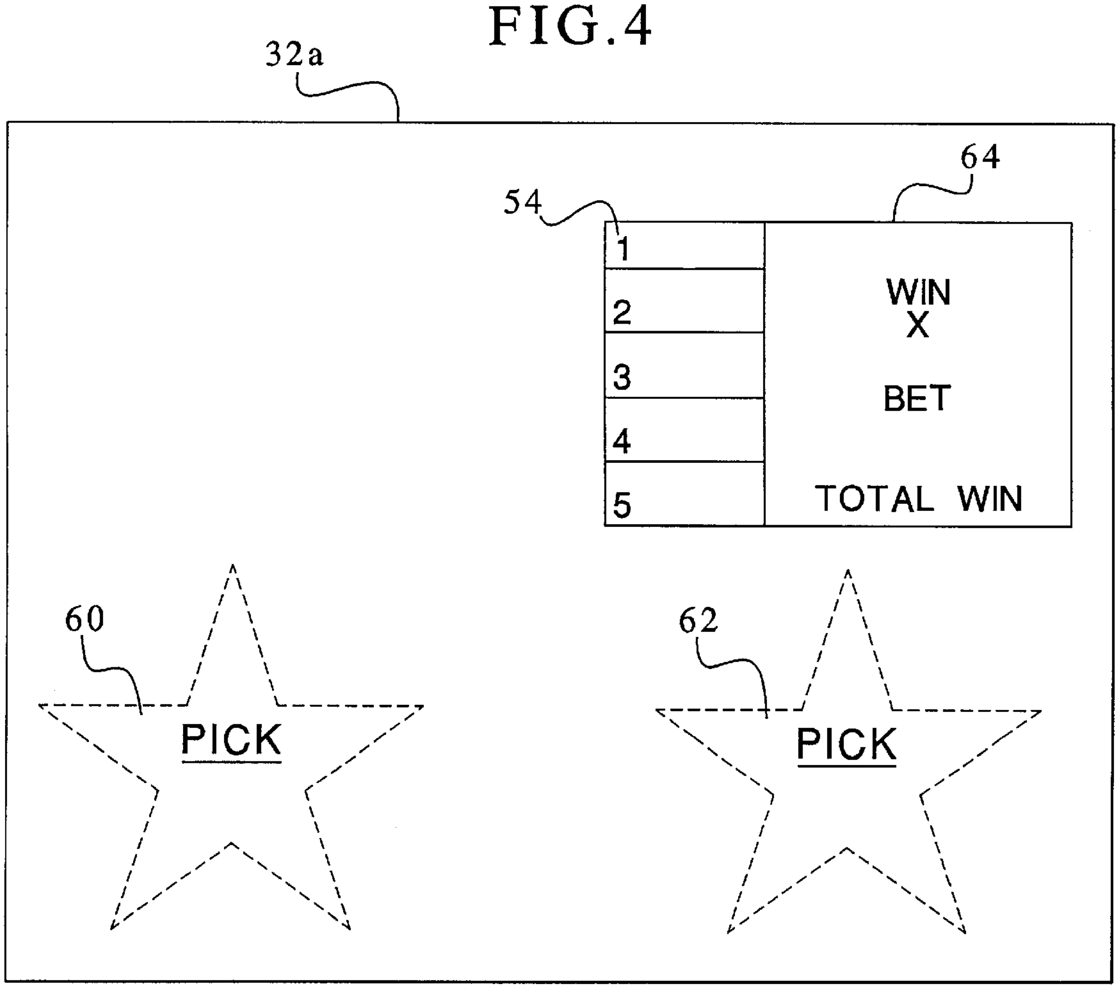
FIG. 3 is a table having multiple bonus round levels wherein each level has multiple sets of awards.
FIG. 4 is a an enlarged front plan view of the display of the present invention containing one embodiment of the present invention having a theme.

Referring to FIG. 3, a table 52 having the components of an embodiment of the present invention is displayed. The table 52 is a database of numbers that are stored in the memory device 40 of the controller. The table 52 has a plurality of levels generally indicated by the number 54, preferably, the levels 1 through 5 as shown. The levels 54 define separate random award generation stages in the bonus round as well as stages of award payouts to the player. The present embodiment is shown having five levels, 1 through 5, however, the present invention contemplates the bonus round having any number of levels and does not limit the invention to the five shown.

Each level contains a plurality of award sets or groups. The present embodiment contains two award sets generally indicated by the numbers 56 and 58. The present invention contemplates the levels having any number of award sets including one, does not limit the levels to having two as shown, but preferably provides at least two award sets per level. Different levels can have a different number of sets, and preferably, the levels have the same number of sets. Level 1 has two sets, 56*a* and 58*a*. Level 2 has two sets, 56*b* and 58*bd*. Level 3 has two sets 56*c* and 58*c*. Level 4 has two sets 56*d* and 58*d*. Level 5 has two sets 56*e* and 58*e*.

Each award set contains a plurality of awards, and each set can have a different number of awards. The sets contain either awards of bonus multipliers, awards of base game credits or awards of bonus round terminators. A bonus multiplier multiplies or increases a player's gaming device credits. Preferably, the gaming device multiplies the player's base game bet shown in the bet display 22. However, the multiplier can also multiply a base game award generated by a winning symbol or combination of symbols on the reels of the gaming device. Awards of bonus multipliers and base game credits are shown in the award sets as numbers, such as the awards 60 and 80 in the set 58*e*.

An award of a bonus terminator is shown by the word "TERM" in the set 58*e*. Bonus terminators terminate the bonus round. When the game randomly generates an award of a bonus terminator, as discussed below, the game ends the bonus round. The award sets, such as 56 and 58, preferably contain either multipliers or base game credits, but preferably not both. The award sets selectively contain one or more bonus terminators as shown in FIG. 3.

The multiple levels of award sets enable the implementor of the bonus round to create a round that has multiple award opportunities for the player, i.e., one opportunity per level. Also, the award sets enable the implementor to structure the awards in the set so that it is increasingly difficult to advance to the next level, but wherein advanced levels contain higher value awards.

The embodiment of FIG. 3 illustrates an example of a bonus round wherein the player is guaranteed of winning one of a plurality of smaller value awards before advancing to later levels that have an increasing risk or probability of bonus termination as well as increasing payouts. Referring to the levels 1 and 2, the award sets 56*a* and 58*a* of level 1 contain no bonus terminators and awards averaging 5.5 and 5.25, respectively. The award sets 56*b* and 58*b* of level 2 contain no bonus terminators and awards averaging 7.5 and 8, respectively.

It should be appreciated that the values of the awards are for illustration purposes, and that the game can employ any desired values. Also, as described in detail below, the award values in a set can have weighted probabilities of occurrence, so that the game randomly selects some values more frequently than others. The awards sets 56 and 58 can have varying average values and there can be more and less desirable sets from the player's perspective. For purposes of illustration, the present embodiment has, for each level, sets containing roughly the same average values and risk level.

The player is guaranteed an award in the first two levels. Beginning with level 3, the player has a 20% chance of obtaining a bonus terminator, which increases to 33% in level 4 and 50% in level 5. The averages of the awards continue to increase as levels advance, wherein the average of sets 56*c* and 58*c* is 12.9 (if set TERM=0), the average of sets 56*d* and 58*d* is 23.83 and the average of sets 56*e* and 58*e* is 43.33. The rates of increase of both risk and value are meant to illustrate the present embodiment, however, the present invention contemplates any rate of increase, including very flat increases and very steep increases.

Referring to FIG. 4 an enlarged view of the video monitor 32 having a screen 32*a* is shown employing one embodiment of the present invention having a theme of a nightclub or lounge. The screen 32*a* contains two pick indicators or buttons 60 and 62 (on the touch screen) that enable the player to play the bonus round levels generally indicated by the number 54. The picks buttons are shown as stars, which relate to the theme, and it should be appreciated that the buttons can have any suitable shape or indicia. The present invention contemplates providing any number of pick buttons. Preferably, the number of pick buttons equals the number of awards sets per level 54; however, a level 54 may contain more award sets than the number of picks buttons provided on a screen such as 32*a*.

Bonus Round Sequence

Figure 5:
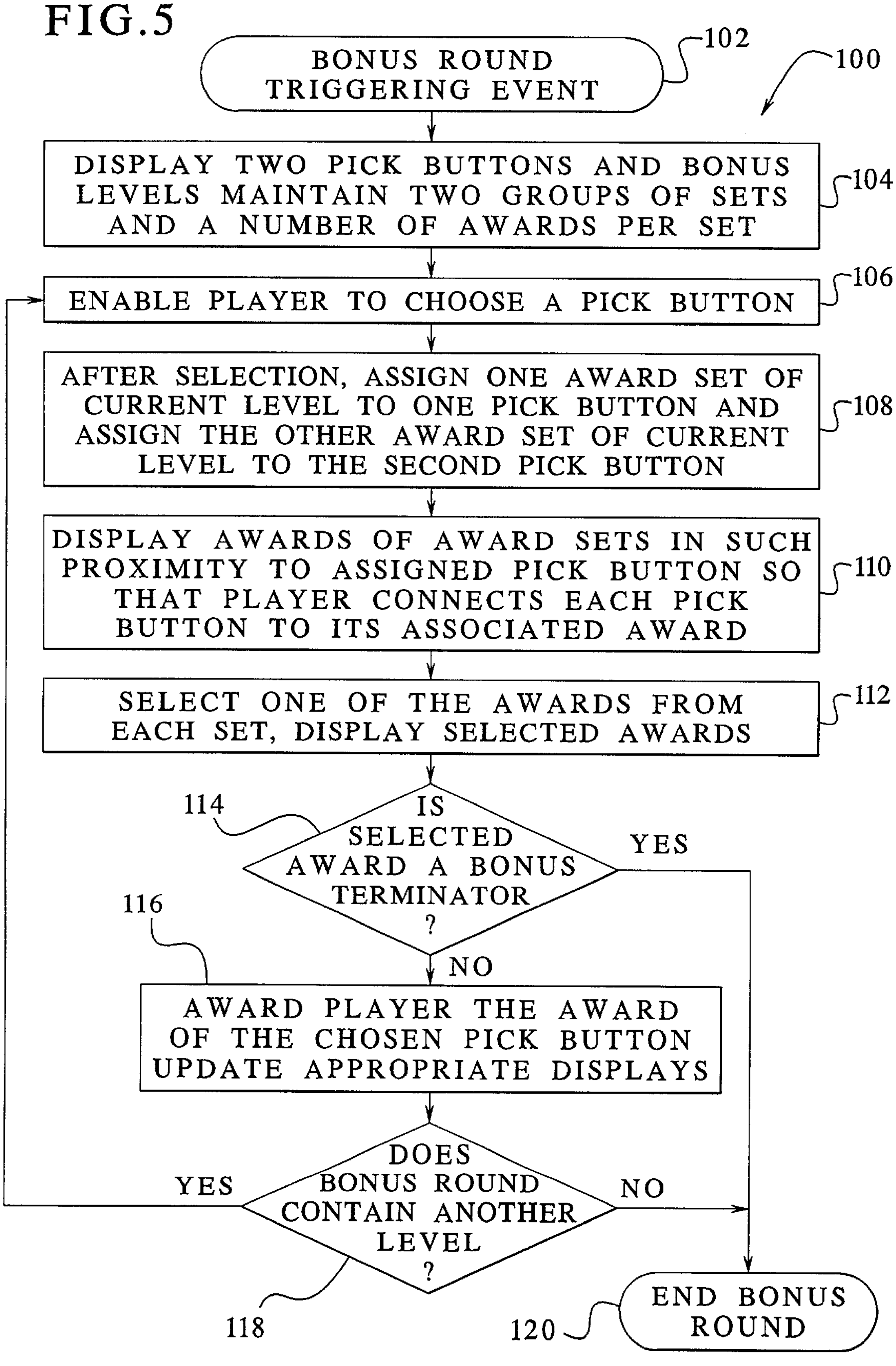
FIG. 5 is a flow diagram of the bonus round sequence that illustrates the multiple random generation components of the present invention.

Referring also now to FIG. 5, a flowchart of the bonus game sequence for the embodiment disclosed in FIG. 4, generally indicated by the number 100, is shown wherein the present invention provides the player with multiple award winning opportunities having varying award values and risk. Upon a bonus round triggering event described above and generally indicated by the oval 102, the present invention displays a bonus screen such as the screen 32*a* in the video monitor 32. The screen displays a plurality of pick buttons. In this embodiment, the screen 32*a* contains two pick buttons 60 and 62, the bonus levels 54, and the game maintains the database of FIG. 3, as indicated by block 104. The game can alternatively contain any number of pick buttons.

The present invention then enables the player to pick or choose one of the pick areas, buttons or indicators, as indicated in block 106. The game provides any suitable instruction to the player such as an audio instruction, e.g., "select the pick button of your choice," or a similar textual message or flashing arrows on the display 32*a*. Likewise, the pick button can contain a suitable instruction, such as the " PICK" instruction contained in the pick area, buttons or indicators 60 and 62 of shown in FIG. 4.

The touch screen 46 of the video monitor 32 preferably enables the player to select or pick a pick button by simply touching the desired button, such as the pick button 60 or 62 in the display 32*a*. Alternatively, the game can operate wherein the video monitor 32 does not contain a touch screen 46. This embodiment requires extra input devices 33 (FIG. 2) similar in form and operation to the cash out button 26 or bet one button 24 described in connection with FIG. 1. The separate input devices, preferably one for each pick button, would connect to the processor 38 and input the player's selection. The video monitor 32 would provide a suitable display recognizing the player's selection and then would provide displays of the remainder of the bonus round as described below. The separate input embodiment can accommodate any number of pick buttons desired by the implementor.

The game preferably indicates the current level in which the player is playing. For example, the embodiment of screen 32*a* in FIG. 4 provides a table 64 similar to table 52 of the database, which both indicate the levels 54, 1 through 5. The table 64 is one of many suitable ways in which the game can indicate the level or stage of the bonus round to the player. It should be appreciated that when the player begins the bonus round, the game accordingly begins at the first level 54, level 1. Before the player chooses a pick area, button or indicator, the game preferably does not display the award sets 56 and 58 to the player in the table 64 or otherwise.

The player's random selection of one of the pick buttons provides the first random generation component to the player's eventual award. After the player chooses one of the pick buttons 60 or 62, the game randomly assigns one of the award sets of the current level, e.g. award sets 56*a* and 58*a* for level 1, to the pick area, button or indicator 60 and one to the pick area, button or indicator 62, as indicated by the block 108. In the present embodiment, the game randomly assigns the award sets 56 and 58 to either the pick buttons 60 and 62 at each level. Alternatively, the present invention contemplates randomly assigning the award sets in the first level and thereafter alternating the sets for each level. For example, if the game randomly assigned the award set 58*a* to pick button 60 in level 1, the game would assign the set 58*b* to pick button 62 in level 2, set 58*c* to pick button 60 in level 3, set 58*d* to pick button 62 in level 4 and set 58*e* to pick button 60 in level 5.

It should be appreciated that level 1 can contain more than two award sets, in which case the game randomly selects and assigns any two of the sets. The game's random assignment of an award set to each of the pick buttons provides the second random generation component to the player's eventual award.

Figure 6:
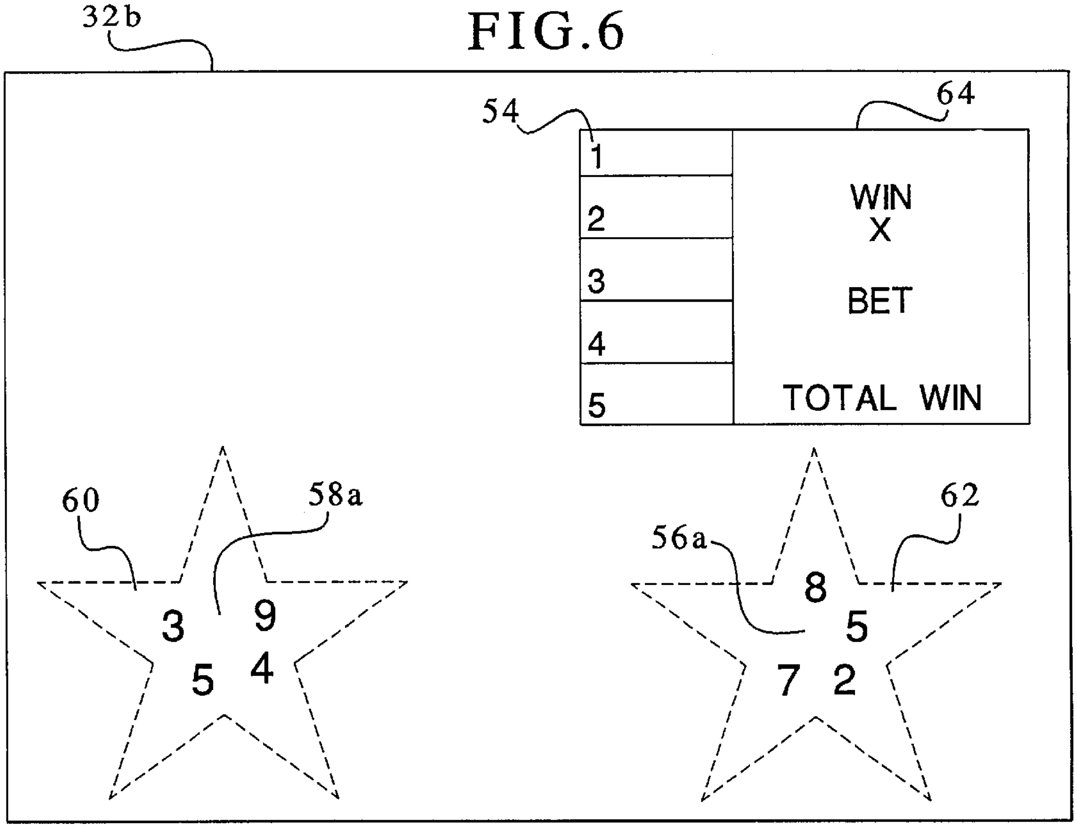
FIG. 6 is a an enlarged front plan view of the display of the present invention containing one embodiment of the present invention having a display of the contents of the associated award sets of the present invention.

Referring also now to FIG. 6, in which the player has chosen a pick area, button or indicator as indicated by block 106, and the game has, for example, assigned the award set 56*a* to the pick button 62 and the award set 58*a* to the pick button 60, as indicated by the block 108, the game preferably flashes or displays the contents of the sets. The game preferably places the awards in such proximity to the assigned buttons, so that the player can easily discern the results of the game's random assignment, as indicated by block 110. In this embodiment, the screen 32*b* shows the indicia or stars of the pick areas containing and displaying the awards of their assigned or associated sets.

The game preferably displays the indicators for a relatively short period of time, e.g., two to four seconds, in which time the game can flash the awards on and off, rotate the awards within a confined area (e.g., the star), or provide any other suitable display that highlights the assignment. The display also preferably indicates to the player that the game is "thinking" of which of the awards to actually give to the player, i.e., the third random generation component to the player's eventual award.

Figure 7:
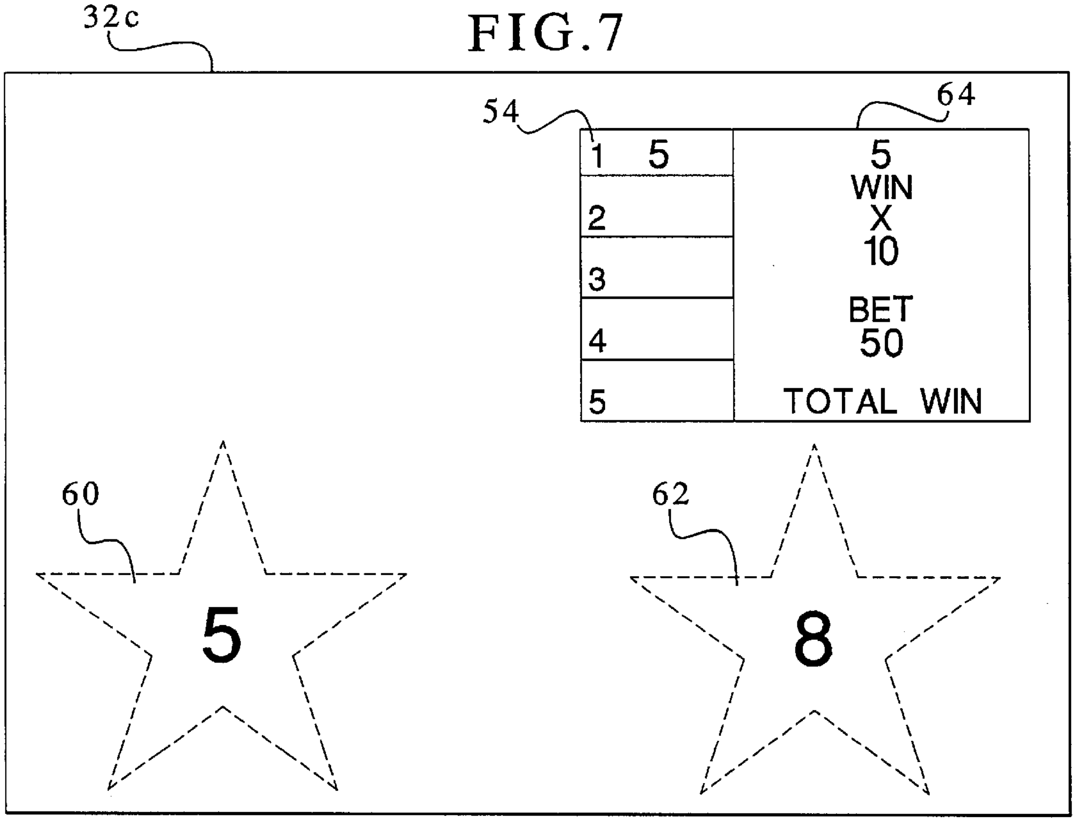
FIG. 7 is a an enlarged front plan view of the display of the present invention containing one embodiment of the present invention having a display of the contents of the selected awards from the associated award sets of the present invention.

After the screen 32*b* displays the award contents for the predetermined amount of time, as indicated by block 110, the game selects one of the awards from each of the assigned or associated award sets and displays the same, as indicated by block 112. Referring now to the screen 32*c* of FIG. 7, the game displays the selected awards for each pick button, namely the game selected the 5 multiplier from the award set 58*a* for the pick button 60 and the 8 multiplier from the award set 56*a* for the pick button 62. Assuming the player earlier chose the pick button 60, as indicated by block 106, the game awards the 5 multiplier.

If the game randomly selects a bonus terminator from the award set assigned to the pick button chosen by the player, as determined in diamond 114, the game ends the bonus round, as indicated by oval 120. Since neither of the award sets of level 1 contain bonus terminators, the present embodiment guarantees an award for this level. It should be appreciated that the bonus round of the present invention can alternatively operate without bonus terminators and end the bonus round after a predetermined number of levels. Further, in an embodiment containing bonus terminators, the round can still end after a predetermined number of levels, wherein the gaming device never randomly selects a bonus terminator. In the present invention, bonus terminators are a tool the implementor employs to increase the risk of bonus round termination.

After the player chooses a pick button, e.g., the button 60, the game does not have to assign an award set to pick button 62 or select an award from the assigned set of the pick button 62; however, the game preferably does so to increase the player's enjoyment and excitement. Displaying the result the player could have just as easily obtained by randomly selecting the other pick button displays the player's relative success or failure for the current level. For example, the game can display a close call scenario, wherein the game randomly selects and displays a bonus terminator for the pick button not chosen by the player.

If the game does not randomly select a bonus terminator from the award set assigned to the pick button chosen by the player, as determined in diamond 114, the game awards the player the 5 multiplier and updates the appropriate displays as indicated by block 116. As illustrated in the table 64, the game multiplies the win for the current level by the player's base game bet shown in the bet display 22 as 10 credits, which yields the player a total win of 50 base game credits. The award can alternatively be an outright number of base game credits as described above.

As determined in diamond 118, after the game updates the player's award, the game determines if another level exists. If another level exists, the game enables the player to choose a pick button for the new level, as indicated in block 106. If another level does not exist, the game ends the bonus round, as indicated by oval 120, and returns the player to the base game operation of the gaming device. The bonus round can have any number of levels desired by the implementor of the gaming device. In the embodiment described above in FIGS. 3, 4, 6 and 7, the bonus round included five levels. The game would thus end after the fifth level assuming that the player did not select one of the bonus round terminators of levels 3, 4 and 5, as illustrated in FIG. 3.

Alternative Embodiments

Referring now to FIG. 8, in one alternative embodiment, the game automatically includes a prize when the player successfully selects from each level from the present invention. The game can award the prize in a plurality of ways. In one way illustrated by FIG. 8, the player does not know the prize is automatic and randomly selects one of the picks buttons as before. It should be appreciated that the player will automatically receive the prize of 100 from the set 56*f* or the prize of 120 from the set 58*f*. The prizes can be different, as shown, or the same.

In another way, the game simply provides a prize after the player successfully selects from each award level. That is, the player does not select one of the pick buttons to receive the prize. The game can increase player enjoyment and excitement by disclosing the existence of an additional prize or even the value of an additional prize up front. The knowledge of such a potential prize increases excitement and enjoyment as the player selects a pick button and waits to learn the player's fate.

Referring now to FIG. 9, in another alternative embodiment of the present invention, the award sets include awards that are weighted, wherein the game randomly selects certain values more frequently than others. FIG. 9 illustrates just one possible method of structuring the award sets. It should be appreciated that one skilled in the art can create many different database structures from the disclosure of FIG. 9.

Each of the awards of the awards sets 56*a* through 56*e* of FIG. 3 is included in the set 66 of FIG. 9. Each of the awards of the awards sets 58*a* through 58*e* of FIG. 3 is included in the set 66 of FIG. 9. FIG. 9 also includes the five levels 54. Each of the levels includes a plurality of weighting percentiles, such as the percentile of 25% 70. It should be appreciated that the percentiles of levels one through five in sets 56 and 58 add to 100%. It is preferable that the percentiles add to 100% although they could add to a lesser percent, such as 90%.

As illustrated in this example of the alternative embodiment, the implementor creates different award sets by setting some or most of the award percentages to zero. Thus, in Level 1 of set 56 of FIG. 9, the game has an equal chance 25% of selecting a 2, 5, 7 or 8 award, which operates exactly the same as the award set 56*a* of FIG. 3. The alternative embodiment creates the ability for the implementor to set different selection probabilities to different awards. For instance, in Level 2 of set 56 of FIG. 9, the game has weighted chances of 20% for selecting a 4, 30% for selecting a 5, 30% for selecting a 7 and 20% for selecting an 8.

The game can increase the probability of selecting a bonus round terminator by setting different percentages in different levels. For instance, in Level 4 of sets 56 and 58, the chance of obtaining a bonus round terminator is 30%. In the final level, Level 5, the chance of obtaining a bonus round terminator increases to 50%.

The game can vary the chances of selecting awards of differing average values. As illustrated by FIG. 9, the implementor can associate the probabilities to higher average awards in later levels. The levels one through five for both sets 56 and 58 contain the same awards and average value distribution as the award sets 56*a* though 56*e* and 58*a* through 58*e*, respectively, of FIG. 3. The difference between the two embodiments includes the weighted probabilities of FIG. 9.

It should be appreciated that one skilled in the art can create a database having different levels with exclusive sets, as illustrated in FIG. 3, wherein each award, including a bonus round terminator, has a weighted probability. However, weighting the awards negates having to provide exclusive award sets, and the implementor can provide an overall set, as illustrated.

The weighted probability embodiment can also include an automatic prize when the player successfully selects from each level as discussed above with FIG. 8. If the implementor desires that the player pick to obtain the prize, FIG. 9 would include a separate level 6 (not shown), wherein one or more prize awards have probabilities that add up to 100%. The implementor can also disclose the existence or value of the prize up front and award the prize without having the player select a pick button.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

What is claimed is:

1. A gaming device having a bonus round comprising:

a plurality of award sets;

at least two sequential award levels, wherein each award level is associated with a different plurality of said award sets;

a plurality of awards in each of said award sets, wherein at least one award in each award set is a non-terminating award that will not cause the termination of the bonus round when selected and at least one award set associated with each level has a plurality of awards different than the awards in the other award sets associated with said level; and a controller having means for sequentially: (a) selecting one of the award sets for each award level from said plurality of award sets associated with said award level and (b) selecting one of said awards from each of said selected award sets to be provided to a player.

2. The gaming device of claim 1, which includes a plurality of sequential award levels.

3. The gaming device of claim 1, wherein said awards each include an associated probability, whereby said probability creates a likelihood of said associated award being selected.

4. The gaming device of claim 1, wherein at least one award set includes at least one bonus round terminator.

5. The gaming device of claim 1, wherein a plurality of award sets include at least one bonus round terminator.

6. The gaming device of claim 1, wherein the award set selecting means includes a plurality of pick indicators associated with each award level and means for selecting an award set for each pick indicator for each award level.

7. The gaming device of claim 6, which includes means for enabling the player to select a pick indicator.

8. The gaming device of claim 1, wherein said award sets contain awards selected from the group consisting of: credits, multipliers and bonus round terminators.

9. The gaming device of claim 1, wherein at least one award set associated with one level has an average value of awards which is higher than an average value of awards of another award set associated with said level.

10. The gaming device of claim 1, wherein at least one award set associated with one level has an average value of awards which is higher than an average value of awards of an award set associated with another level.

11. The gaming device of claim 1, wherein at least two award sets associated with one level have average values of awards which are higher than average values of awards of at least two award sets associated with another level.

12. The gaming device of claim 2, wherein at least one award set is associated with at least two levels, wherein each level includes a probability associated with said award set, and wherein said probability determines a likelihood of said associated award set being selected.

13. A gaming device having a bonus round comprising:

a controller;

a plurality of sequential award levels;

a plurality of different award sets associated with each of said award levels;

a plurality of awards in each of said award sets wherein at least one award in each award set is a non-terminating award, wherein each non-terminating award will not cause the termination of the bonus round when selected;

a plurality of pick indicators connected to the controller;

the controller having means for enabling a player to select one of said pick indicators for each sequential level;

the controller having means for selecting an award set for each selected pick indicator for each sequential level, wherein each selected award set is selected from the plurality of award sets associated with said level; and the controller having means for selecting one of said awards for each sequential level, wherein for each level the selected award is selected from said selected award set associated with the selected pick indicator for that level.

14. The gaming device of claim 13, wherein at least one award set includes at least one bonus round terminator.

15. The gaming device of claim 13, wherein a plurality of award sets include at least one bonus round terminator.

16. The gaming device of claim 13, wherein said pick indicators selecting means includes an area of a touch screen controller associated with each pick indicator.

17. The gaming device of claim 13, wherein said awards sets contain awards selected from the group consisting of: credits, multipliers and bonus round terminators.

18. The gaming device of claim 13, wherein at least one award set is associated with at least two levels, each level includes a probability associated with said award set, and said probability determines a likelihood of said associated award set being selected.

19. The gaming device of claim 13, wherein each of said in each award set includes an associated probability, and wherein said probability creates a likelihood of said associated award being selected.

20. The gaming device of claim 1, wherein at least one award set associated with each level has a plurality of awards different than the awards in another award set associated with another level.

21. The gaming device of claim 4, wherein one of the award sets associated with one level has a higher probability of obtaining a bonus round terminator than one of the award sets associated with another level.

22. The gaming device of claim 4, wherein one of the award sets associated with one level has a higher probability of obtaining a bonus round terminator and an average value of awards which is higher than an average value of awards of another award set associated with another level.

23. A gaming device comprising:

a Primary game operable upon a wager by a player;

a plurality of award sets;

a plurality of awards in each of said award sets wherein at least one award in each award set is a non-terminating award that will not cause a terminating event to occur;

at least two sequential award levels, wherein each award level is associated with a different plurality of award sets and the average value of the awards in at least one award set associated with one award level is different than the average value of the awards in another award set associated with another award level;

a display device;

a processor in communication with said display device; and a triggering event associated with said primary game, wherein after the occurrence of said triggering event, said processor is operable for each sequential award level to:

(a) make a first random selection of one of said award sets from said award sets associated with said award level, (b) make a second random selection of one of said awards from said selected award set, and (c) provide each selected award from each selected award set to a the player.

24. The gaming device of claim 23, wherein the average value of the awards in at least one award set associated with one level is different than the average value of the awards in another award set associated with the same level.

25. The gaming device of claim 23, which includes a plurality of pick indicators associated with each award level, wherein said processor is operable to associate one of the award sets for each pick indicator for each award level, wherein said associated award set is selected from the plurality of award sets associated with said level.

26. The gaming device of claim 25, wherein said processor is operable to enable the player to select one of said pick indicators for each award level.

27. The gaming device of claim 26, wherein said provided award for each level is randomly selected from said award set associated with said player selected pick indicator.

28. The gaming device of claim 23, wherein at least one of the awards of one of the award sets include at least one terminator, wherein if said award is selected, said processor, terminates further selections of awards sets for any remaining levels.

29. The gaming device of claim 28, wherein one of the award sets associated with one of the levels has a greater probability of having an award including a terminator than one of the award sets associated with another one of the levels.

30. A gaming device comprising:

a primary game operable upon a wager by a player;

a plurality of award sets;

a plurality of awards in each of said award sets wherein at least one award in each award set is a non-terminating award that will not cause a terminating event to occur;

a plurality of sequential award levels, wherein each award level is associated with a different plurality of award sets and at least one award set associated with one of the award levels has awards different than at least one other award set associated with the same level;

a display device;

a processor; and a triggering event associated with said primary game, wherein after the occurrence of said triggering event, said processor is operable for each sequential award level to:

(a) make a first random selection of one of said award sets wherein said selected award set is selected from the plurality of award sets associated with said level, (b) make a second random selection of one of said awards from said selected award set; and (c) provide said selected award to the player.

31. The gaming device of claim 30, wherein a plurality of award sets each include a terminator.

32. The gaming device of claim 30, wherein at least one of the award sets associated with one level has awards different than at least one of the award sets associated with another one of the levels.

33. A gaming device comprising:

a primary game operable upon a wager by a player;

at least two sequential award levels;

a plurality of award sets, wherein a different plurality of award sets are associated with each award level;

a plurality of awards in each of said award sets wherein at least one award in each award set is a non-terminating award that will not cause a terminating event to occur;

a plurality of pick indicators;

a display device;

a processor; and a triggering event associated with said primary game, wherein after the occurrence of said triggering event, said processor is operable for each sequential award level to:

(a) make a first selection of one of said pick indicators, (b) make a second random selection of one of the award sets for each pick indicator, wherein said selected award set is selected from the plurality of different award sets associated with said award level, (c) make a third random selection of one of said awards from the selected award set associated with the selected pick indicator, and (d) to provide said selected award from said selected award set to the player.

34. The gaming device of claim 33, wherein the processor enables the player to select one pick indicator for at least one level.

35. The gaming device of claim 33, wherein the processor enables the player to select one pick indicator for each level.

36. The gaming device of claim 33, wherein the average value of the awards in at least one award set associated with one of the award levels is different than the average value of the awards in another award set associated with another of the award levels.

37. The gaming device of claim 33, wherein the average value of the awards in at least one award set associated with one award level is different than the average value of the awards in another award set associated with the same award level.

38. The gaming device of claim 33, wherein at least one award set associated with one award level has different awards than at least one other award set associated with the same award level.

39. The gaming device of claim 33, wherein at least one award set associated with one award level has different awards than at least one award set associated with another award level.

* * * * *

UNITED STATES PATENT AND TRADEMARK OFFICE

CERTIFICATE OF CORRECTION

PATENT NO. : 6,776,711 B1 
DATED : August 17, 2004
INVENTOR(S) : Anthony J. Baerlocher It is certified that error appears in the above-identified patent and that said Letters Patent is hereby corrected as shown below:

Column 13,
Line 34, insert -- awards -- after “said”.

Column 14,
Line 11, delete “a” after “to”.

Signed and Sealed this

Eighth Day of February, 2005

JON W. DUDAS
*Director of the United States Patent and Trademark Office*